A. P. BENNETT.
WINDOW CLEANER.
APPLICATION FILED MAR. 18, 1920.

1,355,728.

Patented Oct. 12, 1920.
2 SHEETS—SHEET 1.

WITNESSES
Oliver H. Holmes
Geo. L. Beeler

INVENTOR
A. P. BENNETT
BY Munn & Co
ATTORNEYS

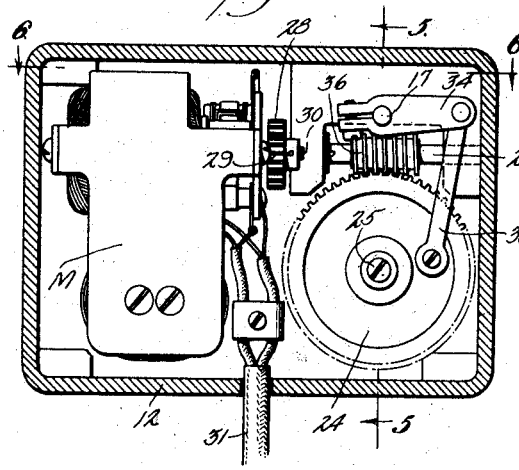

UNITED STATES PATENT OFFICE.

AUGUSTUS P. BENNETT, OF NEW YORK, N. Y.

WINDOW-CLEANER.

1,355,728.                Specification of Letters Patent.    Patented Oct. 12, 1920.

Application filed March 18, 1920. Serial No. 366,827.

*To all whom it may concern:*

Be it known that I, AUGUSTUS P. BENNETT, a citizen of the United States, and a resident of the city of New York, borough of Manhattan, in the county and State of New York, have invented a new and Improved Window-Cleaner, of which the following is a full, clear, and exact description.

This invention relates to devices for mechanically cleaning or scraping accumulations of rain, snow, sleet, mud, or the like, from smooth surfaces such as windows or wind shields of automobiles or other vehicles.

Among the objects of the invention is to provide a means that is adapted to operate independently of the driver of the vehicle or without any attention on his part except to see that it is properly adjusted, and when so adjusted will serve to keep the wind shield in favorable condition for driving and thereby not interfere with the driver in the control of the many controlling and signaling devices that are becoming common or requisite in the practice.

Another object of the invention consequently is to provide a means whereby the wind shield of an automobile or the window of a locomotive cab or railway car vestibule may be kept clean so that the observer within the structure or back of the window will have an unbroken range of vision at all times and will be free so far as the wind shield or window is concerned to give his entire attention to the roadway ahead and the regular control of the machine or vehicle.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Fig. 4 is a vertical sectional view on the line 4—4 of Fig. 5.

Fig. 5 is a vertical transverse section on the line 5—5 of Fig. 4.

Fig. 6 is a horizontal section on the line 6—6 of Fig. 4 with the principal working parts in plan.

Fig. 7 is a perspective view of the nature of Fig. 1 but indicating a modified arrangement.

Figure 1:
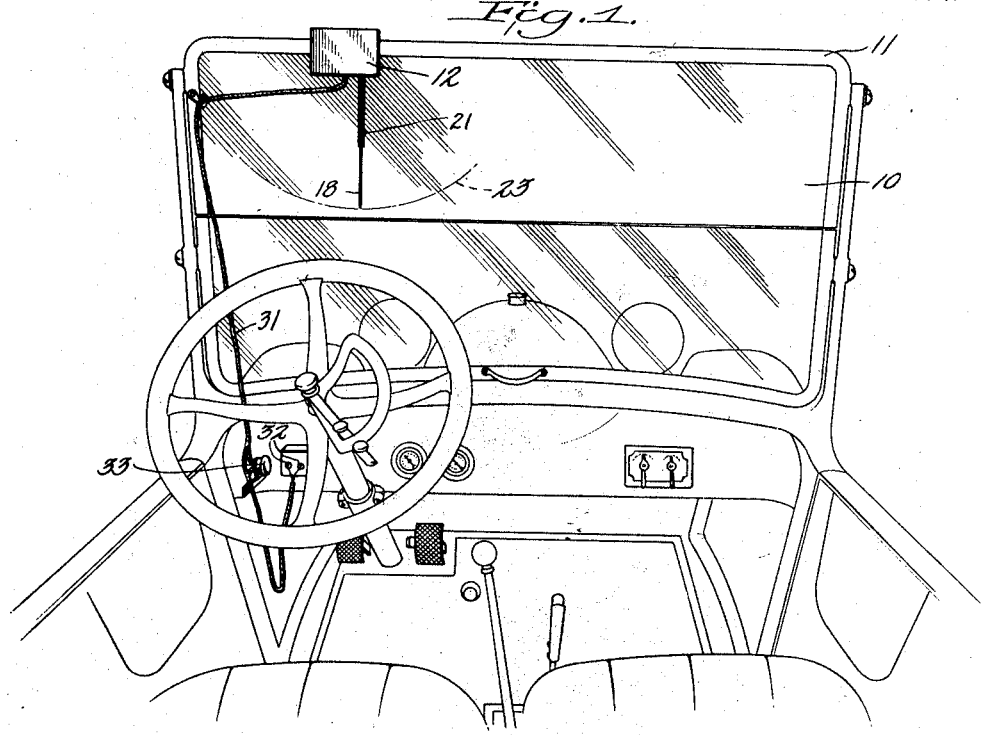
Figure 1 is a rear perspective view of a dash-board and steering apparatus of a motor vehicle indicating the improvement attached to the wind shield.
Figure 2:
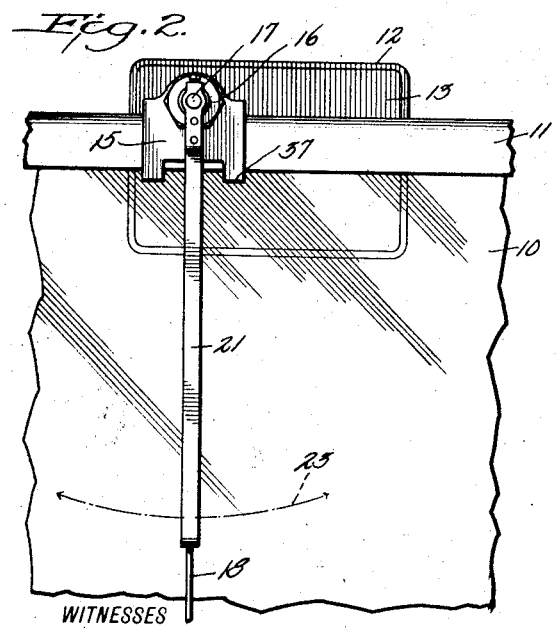
Fig. 2 is an enlarged front elevation of the cleaning device.
Figure 3:
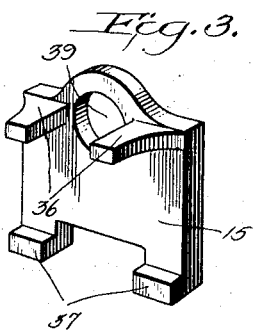
Fig. 3 is a detail perspective view of the clamping plate.

Referring now more specifically to the drawings and describing the operation of the invention in connection with a motor vehicle of more or less conventional design, I show a wind shield plate 10 provided with a rigid frame 11.

The improvement comprises an operating casing 12 shown in the nature of a rectangular box, the front wall 13 of which constitutes a support for the operating mechanism and is provided with a forwardly projecting neck 14 extending across the top of the frame 11 and upon which the clamping plate 15 is fitted and locked by means of a nut 16, or its equivalent. These devices are made so that they constitute a clamp applicable to any size, design or construction of wind shield frame or the like upon which the operating mechanism is adapted to be carried in practice. As shown the neck 14 is provided with an axial bore 14′ in which is journaled a rock shaft 17 independent of the other parts of the clamping means. 18 indicates a squeegee of suitable size and construction to keep a sufficient portion of the plate 10 clear of rain, mist, snow, sleet, or the like. This squeegee is pivoted at 19 on a knuckle 20 carried by the lower end of an arm 21 adapted to be clamped to the forward end of the rock shaft. The arm 21 is made preferably of such material and form as to adapt it to be bent toward or from the wind shield to adapt it to the particular construction, but possessing sufficient strength to hold the squeegee in proper contact with the wind shield. The joint between the squeegee and the knuckle is so designed as to observe a clearance for lost motion at 22 so that the squeegee is free to pivot on the pivot 19 through a sufficient angle to adapt the wiping edge of the squeegee to any irregularities that may be encountered in the front surface of the plate.

Any suitable means may be employed to oscillate the rock shaft 17 and so cause the squeegee to oscillate in an arc of a circle as indicated by the broken lines 23. To this end I show in the principal figures a worm gear 24 journaled to rotate around a fixed pivot 25 within the casing 12, the rotation being caused by means of a worm 26 carried by a shaft 27 on which is fixed a gear 28 driven from the pinion 29 fixed to the shaft 30 of an electric motor M, current to which may be carried through the flexible conductor 31 in any well known manner from any suitable source of energy such as the storage battery of the machine or otherwise. The connections with the source may be made or broken at any time through plugs 32, and at 33 is indicated a manual controlling means which may be a normally open switch and adapted to be closed momentarily by the pressure of the operator's hand, knee or foot whenever he desires to wipe the accumulation from the wind shield, or the switch may be of a nature adapted to be moved so that the connection will be permanent until moved in a reverse direction by the operator. The nature of the clamping means to secure the device to the wind shield frame as well as the electric connections is such as to enable the apparatus to be removed from the operating position quickly whenever desired and as quickly to be replaced for operation.

Clamped adjustably to the inner end of the rock shaft 17 is an arm 34, and between the free end of this arm and the worm gear 24 is a pitman 35 whereby the rotation of the worm gear will cause an oscillation of the arm 34 and parts to which it is connected. The device is of a relatively simple nature and may be put on the market at a low cost and has proved to be of an unusually efficient structure for the purposes indicated.

Referring again to the clamping means for the casing 12 it will be noted that the clamping plate is provided with a plurality of lugs indicated as two pairs 36 and 37. The lugs 36 span the neck 14 and bear upon ribs or fins 38 projecting laterally from said neck at the top of the frame 11. The lugs 37 extend beneath the frame 11 toward but spaced from the plate 10. This construction makes a very rigid and effective clamping connection. The neck 14 projects through a hole 39 at the top of the plate.

In the form shown in Fig. 7 the power is transmitted from the motor M' to the casing 12' through a flexible shaft 31' attached to the shaft 27' of the worm 26. In place of the motor M' as indicated the shaft 31' may be driven from any other suitable source of power, but as indicated the connections both at the wind shield and at the dashboard are substantially the same as above enumerated.

I claim:

1. The herein described window cleaner comprising a movable cleaning member, a stationary support adjacent to the window, means to secure the support in place on one side of the window, said securing means comprising a clamp having a hollow neck with fins on opposite sides, a plate having a hole to receive said neck and having lugs coöperating with said fins and means to secure the plate upon the neck, a shaft journaled in said neck and extending beyond said securing means, connections between the shaft and the cleaning member, and means to rotate the shaft.

2. In a window cleaner, the combination of a support, means to attach the support to the window frame, said means including a neck arranged at right angles to the window frame and having fins on opposite sides, a clamping plate movable along the neck, said clamp having interlocking lugs coöperating with the frame and other lugs coöperating with said fins and a nut threaded upon the neck to grip the plate against the frame, cleaning means, and operating means for the cleaning means carried by the support.

AUGUSTUS P. BENNETT.